United States Patent [19]
Taniguchi et al.

[11] Patent Number: 5,607,490
[45] Date of Patent: Mar. 4, 1997

[54] FILTER HAVING CHEMICAL RESISTANCE, ANTISTATIC PROPERTY AND WATER VAPOR RESISTANCE, AND PROCESS FOR PRODUCING THE SAME

[75] Inventors: Seihou Taniguchi; Takeshi Hazeyama; Hitoshi Otaka, all of Tokyo, Japan

[73] Assignee: Nittetsu Mining Co., Ltd., Tokyo, Japan

[21] Appl. No.: 413,107

[22] Filed: Mar. 29, 1995

[30] Foreign Application Priority Data

Mar. 31, 1994 [JP] Japan ............... 6-083604

[51] Int. Cl.⁶ ............... B01D 29/01; B01D 39/16
[52] U.S. Cl. ............... 55/524; 55/528; 55/DIG. 5; 427/244; 427/372.2; 442/85
[58] Field of Search ............... 55/524, 528, DIG. 5; 96/12–14; 427/244, 372.2, 407.1, 434.2; 428/98, 221, 244, 224, 245, 267, 280, 281, 283, 287, 473.5

[56] References Cited

U.S. PATENT DOCUMENTS

| 4,474,858 | 10/1984 | Makino et al. ............... 96/13 X |
| 4,540,625 | 9/1985 | Sherwood ............... 55/524 X |
| 4,565,727 | 1/1986 | Giglia et al. ............... 55/528 X |
| 4,668,258 | 5/1987 | Steer ............... 96/12 |
| 4,948,400 | 8/1990 | Yamada et al. ............... 96/14 X |
| 5,165,963 | 11/1992 | Matsumoto et al. ............... 96/13 X |
| 5,181,945 | 1/1993 | Bodovsky ............... 55/528 X |
| 5,393,601 | 2/1995 | Heinrich et al. ............... 55/528 X |

FOREIGN PATENT DOCUMENTS

| A30186876 | 7/1986 | European Pat. Off. . |
| 55-119313 | 9/1980 | Japan . |
| 59-129131 | 7/1984 | Japan . |
| 63-066889 | 3/1988 | Japan . |
| 2-002856 | 1/1990 | Japan ............... 96/14 |
| 6-257045 | 9/1994 | Japan . |
| 6257045 | 9/1994 | Japan . |
| 6-327919 | 11/1994 | Japan . |
| WO8908161 | 8/1989 | WIPO . |
| WO9011170 | 10/1990 | WIPO . |

*Primary Examiner*—Robert Spitzer
*Attorney, Agent, or Firm*—Sughrue, Mion, Zinn, Macpeak & Seas

[57] ABSTRACT

A water vapor resistant filter comprising a permeable molded material, nonwoven fabric or felt comprising polyimide fiber having a repeating unit represented by formula (I) is described. The permeable molded material, nonwoven fabric or felt is covered with a condensed polycyclic polynucleus aromatic resin, a melting fluorine resin, a solvent-soluble cold setting fluorine resin or a fluorine elastomer:

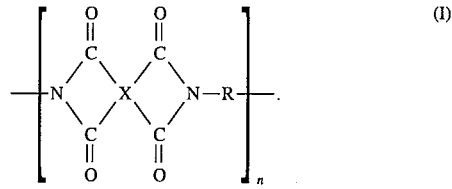

X, R and n are defined in the specification. A water vapor resistant antistatic filter is also described, which comprises a permeable molded material, nonwoven fabric or felt comprising polyimide fiber having a repeating unit represented by the above-described formula (I). The permeable molded material, nonwoven fabric or felt is covered with an electroconductive material and a condensed polycyclic polynucleus aromatic resin, a solvent-soluble cold setting fluorine resin or a fluorine elastomer. Processes for producing these filters are also described.

14 Claims, 1 Drawing Sheet

FIG. 1

FILTER HAVING CHEMICAL RESISTANCE, ANTISTATIC PROPERTY AND WATER VAPOR RESISTANCE, AND PROCESS FOR PRODUCING THE SAME

FIELD OF THE INVENTION

The present invention relates to a filter having excellent heat resistance and flame resistance, which filter is resistant to clogging and has a long operating life. More particularly, the present invention relates to a filter having excellent chemical resistance, antistatic properties and water vapor resistance, and a process for producing the filter.

BACKGROUND OF THE INVENTION

Many permeable materials made of plastics such as cellulose, acetylcellulose, teflon, polycarbonate and nylon are commercially available, including those having various pore sizes. However, the heat resistance of these materials is insufficient.

Permeable molded materials comprising a glass filter have been proposed for use as a high heat resistant filter. However, the molded materials are bulky to the extent that it is difficult to make a thin and compact filter therefrom. Permeable materials made of sintered glass are commercially available; however, these materials are so weak that thin and large products molded therefrom cannot be practically obtained. Furthermore, filters made of glass tend to easily clog.

Examples of high molecular materials which can be used for making high heat resistant molded materials include aromatic polyimides. However, because it is difficult to form a filter cloth from aromatic polyimides, a permeable filter based on such high molecular materials cannot be practically obtained. Likewise, molded filters based on aromatic polyimides also have not been practically obtained.

The preparation of molded products using polyimide powder materials is described by B. H. Lee, *Modern Plastic Encyclopedia*, p.62, (1988). However, this molding method is complicated, for example, because it is often necessary to first make a molded precursor material. Furthermore, when this method is applied, it is difficult to uniformly spread the polyimide powder material in a thin powder layer thickness over a wide area. Thus, it is very difficult to form thin and large permeable molded materials from aromatic polyimides.

Additionally, because the aromatic polyimides have high heat resistance and are only slightly soluble in solvents, it is difficult to prepare powders having a uniform pore size distribution therefrom.

The present inventors investigated preparation of a permeable molded material having various pore sizes. As a result, the present inventors found that such a filter comprising an aromatic polyimide could be prepared by pre-molding an aromatic polyimide filter into a nonwoven fabric or felt, and heating the aromatic polyimide nonwoven fabric or felt filter at a temperature higher than its glass transition temperature for an appropriate length of time as described in JP-A-6-257045 (the term "JP-A" as used herein means an "unexamined published Japanese application").

However, because polyimide has poor hydrochloric acid resistance, its filter properties quickly deteriorate when used to filter gas from the incineration of industrial and municipal wastes containing hydrogen chloride.

In order to improve its chemical resistance, a surface coating method has been proposed wherein a polyimide filter is immersed in a polytetrafluoroethylene dispersion having excellent chemical resistance, and the immersed polyimide filter is dried and heated. However, because the melting viscosity of polytetrafluoroethylene is as high as from $10^{11}$ to $10^{13}$ poise at a shear rate of 10 sec$^{-1}$ and at a temperature of from 340° to 380° C., it is difficult to coat the whole surface of polyimide filter without leaving apertures and many pinholes. Consequently, this surface coating method does not adequately improve the chemical resistance of a polyimide filter.

Furthermore, a polyimide filter has a high electric insulating property. Consequently, when powders are filtrated using a polyimide filter in a dry atmosphere, charges develop by friction between the filter and the powders. Consequently, there is a possibility of a dust explosion upon discharging.

Therefore, in general, an antistatic agent such as glyceride is coated onto the surface of the synthetic fiber surface to inhibit charging of the fiber. However, when waste gas from incineration of industrial and municipal wastes is being filtered, or when filtering is carried out to recover original powders in a high temperature gas in the chemical industries or to collect product powders therein, antistatic agents such as glyceride tend to decompose such that their effects on filtration are of short duration.

In addition, polyimide filters have poor water vapor resistance at high temperatures. Thus, when original powders are recovered from a high temperature gas at high humidity, or when product powders are collected therefrom, the filter properties are rapidly deteriorated.

SUMMARY OF THE INVENTION

An object of the present invention is to provide a polyimide fiber filter prepared by processing a permeable molded material, nonwoven fabric or felt comprising polyimide fiber, having excellent chemical resistance (particularly acid resistance and alkali resistance), antistatic properties and water vapor resistance.

Another object of the present invention is to provide a process for producing the above-described polyimide fiber filter.

These and other objects of the present invention have been attained by a water vapor resistant filter comprising a permeable molded material, nonwoven fabric or felt, wherein the permeable molded material, nonwoven fabric or felt comprises polyimide fiber having a repeating unit represented by the following formula ( I ), and the permeable molded material, nonwoven fabric or felt is covered with a condensed polycyclic polynucleus aromatic resin:

wherein n represents an integer of more than 1; X represents a tetravalent aromatic group selected from the group consisting of and R represents at least one divalent aromatic group selected the group consisting of Furthermore, these and other objects of the present invention have been attained by a process for producing the above-described water vapor resistant filter, which comprises the steps of immersing a permeable molded material, nonwoven fabric or felt comprising polyimide fiber having the above-described repeating unit represented by formula (I) into an organic solution containing a condensed intermediate of a condensed polycyclic polynucleus aromatic resin in a concentration of from 20 to 60% by weight, drying the immersed permeable molded material, nonwoven fabric or felt to cover the permeable molded material, nonwoven fabric or felt with the condensed intermediate, and thermosetting the condensed intermediate covering the permeable molded material, nonwoven fabric or felt.

Moreover, these and other objects of the present invention have been attained by a water vapor resistant filter comprising a permeable molded material, nonwoven fabric or felt, wherein the permeable molded material, nonwoven fabric or felt comprises polyimide fiber having the above-described repeating unit represented by formula (I), and the permeable molded material, nonwoven fabric or felt is covered with a melting fluorine resin, a solvent-soluble cold setting fluorine resin or a fluorine elastomer.

Still further, these and other objects of the present invention have been attained by a process for producing the above-described water vapor resistant filter, which comprises the steps of (a) coating the above-described permeable molded material, nonwoven fabric or felt with a dispersion of a melting fluorine resin fine powder dispersed in water or in an organic solvent or with a dispersion of a melting fluorine resin fine powder and a synthetic resin dispersed in water or in an organic solvent, and heating the coated nonwoven fabric or felt at a temperature of from 260° to 400° C.; (b) coating the above-described permeable molded material, nonwoven fabric or felt with a solution of solvent-soluble cold setting fluorine resin, and drying the coated nonwoven fabric or felt at room temperature or by heating; or (c) coating the above-described permeable molded material, nonwoven fabric or felt with a solution or latex of a fluorine elastomer, and heating the coated permeable molded material, nonwoven fabric or felt.

Still moreover, these and other objects of the present invention have been attained by a water vapor resistant antistatic filter comprising a permeable molded material, nonwoven fabric or felt, wherein the permeable molded material, nonwoven fabric or felt comprises polyimide fiber having the above-described repeating unit represented by formula (I), and the permeable molded material, nonwoven fabric or felt is covered with (i) an electroconductive material and (ii) a condensed polycyclic polynucleus aromatic resin, a solvent-soluble cold setting fluorine resin or a fluorine elastomer.

In addition, these and other objects of the present invention have been attained by a process for producing the above-described water vapor resistant antistatic filter, which comprises the steps of (a) coating the above-described permeable molded material, nonwoven fabric or felt with an electroconductive material and a condensed polycyclic polynucleus aromatic resin dispersed in an organic solvent, and heating the coated permeable molded material, nonwoven fabric or felt at a temperature of from 150° to 300° C.; (b) coating the above-described permeable molded material, nonwoven fabric or felt with an electroconductive material and a solvent-soluble cold setting fluorine resin dispersed in an organic solvent, and drying the coated permeable molded material, nonwoven fabric or felt at room temperature or by heating; or (c) coating the above-described permeable molded material, nonwoven fabric or felt with an electroconductive material and a fluorine elastomer dispersed in water or in an organic solvent, and drying the coated permeable molded material, nonwoven fabric or felt at room temperature or by heating.

BRIEF DESCRIPTION OF THE DRAWING

(1) shows the melting viscosity range of a copolymer of tetrafluoroethylene and perfluoroalkylvinyl ether.

(2) shows the melting viscosity range of a copolymer of tetrafluoroethylene and hexafluoropropylene.

(3) shows the melting viscosity range of a copolymer of ethylene and tetrafluoroethylene.

(4) shows the melting viscosity range of a copolymer of ethylene and chlorotrifluoroethylene.

(5) shows the melting viscosity range of polytetrafluoroethylene.

DETAILED DESCRIPTION OF THE INVENTION

The condensed polycyclic polynucleus aromatic resin for use in the present invention is preferably prepared by a heating condensation polymerization reaction between a condensed polycyclic aromatic hydrocarbon, such as naphthalene, anthracene, phenanthrene, pyrene and pitch, and a crosslinking agent, such as 1,4-benzenedimethanol in presence of an acid catalyst.

In preferred embodiments of the present invention, the method of covering the surface of a permeable molded material, nonwoven fabric or felt comprising high heat resistant polyimide fiber with a thermosetting resin comprises the steps of (a) immersing the permeable molded material, nonwoven fabric or felt in a low molecular resin compound or in a solution obtained by diluting the resin compound with a solvent, or coating the surface of the permeable molded material, nonwoven fabric or felt with the resin compound or resin compound solution to cover the surface of the polyimide fiber constituting the permeable material, and (b) condensing the resin in the presence of a condensing catalyst. As a matter of course, after a condensed intermediate is formed, the condensed intermediate may be used in place of the low molecular resin compound, and, if desired, the intermediate may be used after diluting with a solvent. That is, the surface of the permeable molded material, nonwoven fabric or felt may be immersed in or coated with the condensed intermediate to cover the surface of the polyimide fiber.

In the present invention, the step of covering a permeable molded material, nonwoven fabric or felt with a condensed polycyclic polynucleus aromatic resin may be carried out as follows.

In one method of forming a permeable molded material, nonwoven fabric or felt from high heat resistant polyimide fiber, nonwoven fabric or felt is premolded from high heat resistant polyimide fiber, and the constituent polyimide fibers are fused with each other to the extent that the desired permeability is obtained by heating and pressing the premolded material, to thereby form a permeable molded material, nonwoven fabric or felt, as disclosed in WO 89/08161. Accordingly, a surface of an original polyimide fiber is present at the surface or inside of the permeable molded material, nonwoven fabric or felt. The permeable molded material, nonwoven fabric or felt is then immersed in a low molecular compound of a component constituting a condensed polycyclic polynucleus aromatic resin (or a condensed intermediate obtained by condensing a low molecular compound of a resin component) or a solution thereof diluted with a solvent, or is coated with the low molecular compound or the solution thereof to permeate therein. As a result, the low molecular compound of the resin component can cover the surface of the permeable molded material, nonwoven fabric or felt and the surface of the polyimide fiber of the inside of the permeable molded material, nonwoven fabric or felt.

In the method of covering the surface of the high heat resistant polyimide fiber of the permeable molded material, nonwoven fabric or felt with a condensed polycyclic polynucleus aromatic resin as a thermosetting resin, the surface of the molded material, nonwoven fabric or felt is covered with a condensed polycyclic aromatic hydrocarbon in the presence of an acid catalyst and a crosslinking agent or with a condensed intermediate which is condensed by a heating reaction of a condensed polycyclic aromatic hydrocarbon and a crosslinking agent in the presence of a crosslinking agent. The condensed polycyclic aromatic hydrocarbon and the condensed intermediate may be diluted with a solvent, such as methyl ethyl ketone and tetrahydrofuran, if needed. Examples of the condensed polycyclic aromatic hydrocarbon include naphthalene, anthracene, phenanthrene, pyrene and pitch. Examples of the crosslinking agent include 1,4-benzene dimethanol. Thus, a protective layer having heat resistance and chemical resistance is provided on the surface of the molded material, nonwoven fabric or felt by a heating polycondensation reaction.

Examples of the solvent-soluble condensed intermediate of the condensed polycyclic polynucleus aromatic resin include SK Resin (produced by Sumikinkako Chemical Co., Ltd.) having the following structure:

The word "solvent-soluble" as used herein does not mean that a resin and the like are completely dissolved to the degree of a molecular dispersion. In some cases the resin may be dissolved to form a colloidal dispersion. However, in the present invention, the resin and the like should be sufficiently solvent-soluble to penetrate into the permeable molded material, nonwoven fabric or felt and to provide the desired chemical resistance.

A preferred embodiment is illustrated below; however, the present invention should not be construed as being limited thereto.

A high heat resistant polyimide molded material, nonwoven fabric or felt is immersed in an organic solvent solution containing a solvent-soluble condensed intermediate of the above-described condensed polycyclic polynucleus aromatic resin in a concentration of from 20 to 60% by weight, the surface of the polyimide molded material, nonwoven fabric or felt is covered with the condensed intermediate of the condensed polycyclic polynucleus aromatic resin by drying, and the condensed intermediate is thermoset at a thermosetting temperature for a predetermined time. As a result, a protective layer having excellent chemical resistance can be provided on the surface of the molded material, nonwoven fabric or felt.

In the present invention, in order to provide a filter comprising polyimide fiber having chemical resistance, the surface of a permeable molded material, nonwoven fabric or felt comprising polyimide resin may be covered with (a) a dispersion of a melting fluorine resin fine powder dispersed in water or in an organic solvent alone or in combination with a synthetic resin, (b) a solution of a solvent-soluble cold setting fluorine resin, or (c) a solution or latex of a fluorine elastomer.

Examples of the melting fluorine resin coated as a fine powder dispersed in water or in an organic solvent alone or in combination with a synthetic resin include a copolymer of tetrafluoroethylene and perfluoroalkylvinyl ether, a copolymer of tetrafluoroethylene and hexafluoropropylene, a copolymer of ethylene and tetrafluoroethylene, and a copolymer of ethylene and chlorotrifluoroethylene.

The melting fluorine resin for use in the present invention has an appropriate melting viscosity so that it can cover the fiber surface without leaving openings by melting and flowing at a temperature range within which the polyimide fiber is not deteriorated by heat. Accordingly, in reference to FIG. 1 which shows the relationship of temperature and melting viscosity, a resin having a melting viscosity range not exceeding line segment AB which connects point A and point B is preferred.

Figure 1:
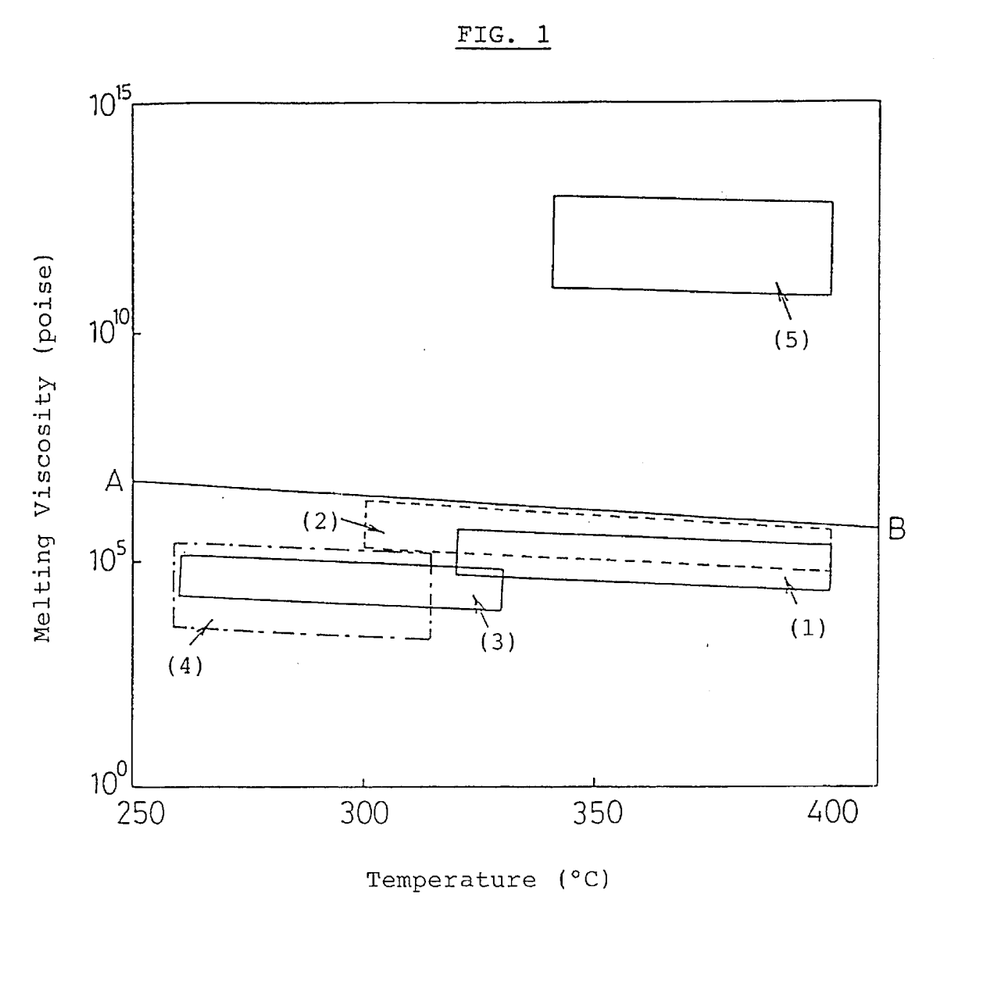
FIG. 1 shows the relationship of the melting viscosity of various melting fluorine resins as a function of temperature.

Namely, a resin having a melting viscosity of $10^6$ poise or less at 260° C. and a melting viscosity of $10^5$ poise or less at 400° C. at a shear rate of 10 $\sec^{-1}$ is preferred.

If the melting viscosity is larger than the above-described range, the flowability of the melting fluorine resin is insufficient to cover the fiber surface without leaving openings. Therefore, because pinholes are formed, the resulting filter has poor chemical resistance.

Specific examples of the melting fluorine resin for use in the present invention include a copolymer of tetrafluoroethylene and perfluoroalkylvinyl ether represented by the following formula (II) (a melting viscosity of from $10^4$ to $10^5$ poise at a shear rate of 10 $\sec^{-1}$ and at a temperature of 380° C.), a copolymer of tetrafluoroethylene and hexafluoropropylene represented by the following formula (III) (a melting viscosity of from $4\times10^4$ to $4\times10^5$ poise at a shear rate of 10 $\sec^{-1}$ and at a temperature of 380° C.), a copolymer of ethylene and tetrafluoroethylene represented by the following formula (IV) (a melting viscosity of from $10^4$ to $10^5$ poise at a shear rate of 10 $\sec^{-1}$ and at a temperature of from 300° to 330° C.), and a copolymer of ethylene and chlorotrifluoroethylene represented by the following formula (V) (a melting viscosity of from $2\times10^3$ to $2\times10^5$ poise at a shear rate of 10 $\sec^{-1}$ and at a temperature of from 260° to 315° C.):

Preferably, the polyimide fiber molded material, nonwoven fabric or felt is immersed in a dispersion of the above-described fluorine resin fine powder in a dispersion medium at a concentration of from 10 to 60% by weight, the fluorine resin fine powder adheres to the surface of the molded material, nonwoven fabric or felt by drying after removing the molded material, nonwoven fabric or felt from the dispersion, and the adhered powder is heated and melted at a temperature of from 260° to 400° C. to flow and fuse the fine powder particles with each other to cover the surface of the fiber without leaving openings.

In this case, if the concentration of the melting fluorine resin fine powder in the dispersion is within an appropriate range, the material obtained can exhibit filter properties without losing permeability of the polyimide fiber permeable molded material, nonwoven fabric or felt.

The dispersion of the melting fluorine fine powder may be a dispersion in which the melting fluorine resin particles are dispersed in water or in an organic solvent alone or a dispersion in which a mixture of a synthetic resin, such as epoxy resin, phenol resin, urethane resin and silicon resin, and the melting fluorine resin powder is dispersed in water or in an organic solvent. Examples of the organic solvent include ethyl acetate, propyl acetate and methyl isopropyl ketone. The synthetic resin is preferably a precondensed resin.

Furthermore, examples of the solvent-soluble cold setting fluorine resin coated as a solution on the surface of a permeable molded material, nonwoven fabric or felt comprising polyimide fiber to provide a filter comprising the polyimide fiber having chemical resistance properties include a fluoridated vinylidene copolymer, a copolymer of fluoroolefin and hydrocarbon vinyl ether, and a copolymer of fluoroepoxy resin.

The solvent-soluble cold setting fluorine resin is preferably dissolved in an organic solvent, such as ethyl acetate, methyl isopropyl ketone and isobutyl benzene, and set by drying at room temperature or by heating at a temperature which does not adversely affect the polyimide fiber.

Specific examples of the solvent-soluble cold setting fluorine resin include a copolymer of fluoroolefin and hydrocarbon vinyl ether having the following formula (VI):

$$+CF_2CFXCH_2CH)_{\overline{m}} \quad (VI)$$
$$\qquad\qquad\qquad |$$
$$\qquad\qquad\qquad OR$$

wherein X represents —F, —$CF_3$ or —Cl; and R represents an alkyl group.

Moreover, examples of the fluorine elastomer coated as a solution or latex on the surface of the permeable molded material, nonwoven fabric or felt comprising polyimide fiber to provide a filter comprising the polyimide fiber having chemical resistance properties include a copolymer of vinylidene fluoride and hexafluoropropylene and a copolymer of tetrafluoroethylene and propylene.

The fluorine elastomer for use in the present invention is preferably soluble in an organic solvent, such as methyl isobutyl ketone, acetone and methyl ethyl ketone, or forms an emulsion with water. Furthermore, the fluorine elastomer is preferably easily cured in a temperature range which does not deteriorate the polyimide fiber by heating and exhibits chemical resistance and heating resistance properties upon curing.

Specific examples of the fluorine elastomer for use in the present invention include a copolymer of vinylidene fluoride ($CH_2=CF_2$) and hexafluoropropylene ($CF_2=CF-CF_3$) and a copolymer of tetrafluoroethylene ($CF_2=CF_2$) and propylene ($CH_2=CH-CH_3$).

In the present invention, the fluorine elastomer means a polymer or copolymer prior to curing.

Furthermore, in the present invention, in order to provide a permeable molded material, nonwoven fabric or felt comprising high heat resistant polyimide fiber having chemical resistance and antistatic properties, the surface of the permeable molded material, nonwoven fabric or felt may be covered with (a) an electroconductive material and a condensed polycyclic polynucleus aromatic resin dispersed in an organic solvent, (b) an electroconductive material and a solvent-soluble cold setting resin dispersed in an organic solvent, or (c) an electroconductive material and a fluorine elastomer dispersed in water or in an organic solvent.

Examples of the electroconductive material include a carbon black powder such as acetylene black, furnace black and channel black, and a metal powder such as copper, zinc, tin, gold and silver. In addition, carbon fiber and graphite are used as an electroconductive material.

In the present invention, the nonwoven fabric or felt comprising polyimide fiber is preferably heated at a temperature not lower than the secondary transition temperature of the polyimide fiber and pressed to form a permeable molded material, and then the antistatic layer is covered thereon without losing permeability. However, the antistatic filter may be formed by directly covering the nonwoven fabric or felt comprising the polyimide fiber with an antistatic layer.

Examples of the condensed polycyclic polynucleus aromatic resin coated on the surface of a permeable molded material, nonwoven fabric or felt comprising polyimide fiber to provide a filter comprising polyimide fiber having antistatic properties include those described above, and they are obtained in the same manner as the above-described condensed polycyclic polynucleus aromatic resin. Specific examples thereof also include SK Resin described above.

An example of preferred processing conditions which can be used to cover the surface of polyimide fiber with an electroconductive resin by a condensed polycyclic polynucleus aromatic resin is illustrated below.

An electroconductive material dispersion solution is prepared by dispersing an electroconductive material into a solution in which B-staged polymer of a condensed polycyclic polynucleus aromatic resin is dissolved in a solvent. A permeable molded material, nonwoven fabric or felt comprising polyimide fiber is immersed therein, and the solvent is removed by drying. The B-staged polymer is prepared by polycondensing a condensed polycyclic polynucleus aromatic resin in the presence of an acid catalyst and a crosslinking agent, and is a soluble and meltable solid polymer having a low degree of polymerization.

Next, the resin coated permeable molded material, nonwoven fabric or felt is maintained at a thermosetting temperature of from 150° to 300° C. for 1 to 3 hours to thermoset the resin. As a result, the surface of the polyimide fiber is uniformly covered with an electroconductive material. Since the electroconductive material is fixed via the condensed polycyclic polynucleus aromatic resin to the surface of the polyimide fiber, the electroconductive material does not fall away from the surface of the polyimide even if it comes into contact with a high temperature and corrosive gas. Accordingly, the filter thus obtained exhibits an antistatic effect over a long operating life.

In this case, if the amount of the electroconductive material adhering to the polyimide fiber with the condensed polycyclic polynucleus aromatic resin is within an appropriate range, a filter having an excellent antistatic property can be obtained without losing the permeability of the molded material, nonwoven fabric or felt of the polyimide fiber.

Examples of the solvent-soluble cold setting fluorine resin and the fluorine elastomer that can be used for providing a filter comprising polyimide fiber having an antistatic property include those described above, respectively. They are covered on the surface of the polyimide fiber in the same manner as the above-described solvent-soluble cold setting fluorine resin and the fluorine elastomer, respectively, except for adding an electroconductive material in an appropriate amount. The fluorine elastomer may be used as a latex or solution thereof.

The ratio of the electroconductive material to the condensed polycyclic polynucleus aromatic resin, the solvent-soluble cold setting fluorine resin or the fluorine elastomer is from 2:98 to 20:80 by weight. When the electroconductive material, particularly the carbon black, is dispersed in a solution such as the SK Resin, the viscosity of the solution is increased. As a result, the solution is required to be diluted. That is, even if the concentration of the condensed intermediate of a condensed polycyclic polynucleus aromatic resin is lower than 20% by weight, the antistatic filter according to the present invention can be obtained.

As is described above, the present invention provides a filter comprising a permeable molded material, nonwoven fabric or felt having excellent chemical resistance, particularly acid resistance and alkali resistance, and also water vapor resistance, by covering the polyimide molded material, nonwoven fabric or felt with a condensed polycyclic polynucleus resin.

Furthermore, the present invention provides a filter comprising polyimide fiber permeable molded material, nonwoven fabric or felt having excellent chemical resistance and water vapor resistance by covering the permeable molded material, nonwoven fabric or felt with a melting fluorine resin, a solvent-soluble cold setting fluorine resin or a fluorine elastomer.

Moreover, the present invention provides a filter comprising a permeable molded material, nonwoven fabric or felt having excellent chemical resistance and an antistatic property by covering the permeable molded material, nonwoven fabric or felt with (i) an electroconductive material and (ii) a condensed polycyclic polynucleus aromatic resin, a solvent-soluble cold setting fluorine resin or a fluorine elastomer.

In addition, in the present invention, because a permeable molded material, nonwoven fabric or felt comprising polyimide fiber is covered with a condensed polycyclic polynucleus aromatic resin, a melting fluorine resin, a solvent-soluble coldsetting resin or a fluorine elastomer, the contact portions of the molded material, nonwoven fabric or felt are strongly bound and fixed by the resin or elastomer. As a result, the strength of the filter comprising the molded material, nonwoven fabric or felt is remarkably increased.

The present invention is now illustrated in greater detail by way of the following examples, but it should be understood that the present invention is not to be construed as being limited thereto. All percents, parts and ratios are by weight unless otherwise indicated.

EXAMPLES

Example 1

A premolded felt (basis weight: 475 g/m$^2$, thickness: 2 mm) was prepared by a needle punch method from polyimide fiber having an elongation ratio of 1:5 and a thickness of 30 μm. The polyimide fiber was made from benzophenon-3,3',4,4'-tetracarbonic acid dianhydride and 4,4'-methylene-bis(tolyleneisocyanate). A sheet having a thickness of 1 mm was molded from the premolded felt by heating at 340° C. for 30 minutes, and an examination specimen having a width of 45 mm and a length of 120 mm was cut therefrom.

The polyimide constituting the above-described polyimide fiber had the following chemical structure:

$$\left[ \begin{array}{c} \text{structure} \end{array} \right]_n$$

The examination specimen was immersed in a 20% solution of the above-described SK Resin diluted with a 50/50 (by weight) mixture solution of methyl ethyl ketone and tetrahydrofuran for 5 minutes. Next, the specimen was dried at room temperature for 24 hours, and then placed in an electric furnace at 150° C. for 24 hours to thermoset the SK Resin on the polyimide fiber of the specimen.

The thickness of the specimen covered with the thermoset SK Resin was measured, and the density thereof was calculated. Also, the tensile strength of the specimen was measured to calculate tensile strength retention. The coated amount was calculated.

The specimen was inserted into a pipe having a diameter of 20 mm, and the amount of air permeating therethrough was measured at a pressure of 0.1 kg/cm$^2$.

Furthermore, after the specimen was immersed in a 10% hydrochloric acid at 23° C. for 200 hours or a 5% sodium hydroxide solution at 23° C. for 120 hours, washed and dried, the tensile strength was measured again to calculate tensile strength retention.

The results obtained are shown in Table 1 below.

Example 2

A specimen was prepared, treated and evaluated in the same manner as in Example 1, except that the concentration of the SK Resin solution was changed to 40%.

The results obtained are shown in Table 1 below.

Example 3

A specimen was prepared, treated and evaluated in the same manner as in Example 1, except that the concentration of the SK Resin solution was changed to 60%.

The results obtained are shown in Table 1 below.

Comparative Example 1

A specimen was prepared, treated and evaluated in the same manner as in Example 1, except that the specimen was not covered with the SK Resin.

The results obtained are shown in Table 1 below.

Comparative Example 2

A specimen was prepared, treated and evaluated in the same manner as in Example 1, except that the concentration of the SK Resin solution was changed to 10%.

The results obtained are shown in Table 1 below.

Comparative Example 3

A specimen was prepared, treated and evaluated in the same manner as in Example 1, except that the concentration of the SK Resin solution was changed to 80%.

The results obtained are shown in Table 1 below.

Comparative Example 4

A polytetrafluoroethylene suspension was prepared by adding 40 g of polytetrafluoroethylene having a particle diameter of 3 μm in small portions with stirring into a vessel containing 60 g of distilled water.

A specimen prepared in the same manner as in Example 1 was immersed in the above-described polytetrafluoroethylene suspension for 5 minutes. Afterwards, the specimen was dried at room temperature for 24 hours, and then placed in an electric furnace at 340° C. for 5 hours to cover the polyimide fiber surface of the specimen with the polytetrafluoroethylene.

The specimen was evaluated in the same manner as in Example 1.

The results obtained are shown in Table 1 below.

TABLE 1

| Example No. | SK Resin concentration (%) | Density (g/cm³) | Coated Amount (g/m²) | Air permeable amount (ml/cm² · min) | Tensile strength retention 10% HCl immersion (23° C., 200 hr.) (%) | Tensile strength retention 5% NaOH immersion (23° C., 120 hr.) (%) |
|---|---|---|---|---|---|---|
| Example 1 | 20 | 0.63 | 40.0 | 530 | 91 | 85 |
| Example 2 | 40 | 0.66 | 69.9 | 510 | 97 | 94 |
| Example 3 | 60 | 0.76 | 169.8 | 440 | 99 | 97 |
| Comparative Example 1 | 0 | 0.59 | — | 560 | 69 | 85 |
| Comparative Example 2 | 5 | 0.61 | 20.0 | 550 | 76 | 64 |
| Comparative Example 3 | 80 | 1.09 | 499.5 | 250 | 99 | 98 |
| Comparative Example 4 | PTFE* | 0.67 | 79.9 | 515 | 74 | 62 |

*Note: PTFE; Polytetrafluoroethylene covering treatment

Example 4

The specimen of Example 2 was placed in a 2 l pressure vessel containing 20 ml of pure water, and was heated to 210° C. (at a pressure of 12 kg/cm²) for 28 hours. After drying, the density, the air permeable amount and the tensile strength were measured, and the retention thereof was calculated. The density, the air permeable amount and the tensile strength retention were 0.67 g/cm³, 515 ml/cm²·min and 98%, respectively.

Comparative Example 5

The specimen of Comparative Example 1 was treated and evaluated in the same manner as in Example 4. The density, the air permeable amount and the tensile strength retention were 0.58 g/cm³, 560 ml/cm²·min and 59%, respectively.

Examples 1 to 4 and Comparative Examples 1 to 5 show that the weak chemical resistance and water vapor resistance of untreated polyimide are remarkably improved by covering the polyimide fiber with a condensed polycyclic polynucleus aromatic resin according to the present invention. The condensed polycyclic polynucleus aromatic resin is therefore useful as a protective covering agent for a polyimide fiber filter. As a result, the field of application of the thus treated filter can be expanded by providing a polyimide fiber filter having good chemical and water vapor resistance.

Furthermore, because the contact portions of the polyimide fibers of the high heat resistant polyimide molded material are strongly bound and fixed via the condensed polycyclic polynucleus aromatic resin, the covering treatment of the condensed polycyclic polynucleus aromatic resin according to the present invention can remarkably improve the strength of the filter comprising a permeable high heat resistant polyimide molded material.

Example 5

A dispersion was prepared by dispersing 30 g of a copolymer of tetrafluoroethylene and perfluoropropylvinyl ether having a mean particle size of 0.4 μm in small portions with stirring into a vessel containing 70 g of distilled water and 0.8 g of polyethylene glycol fatty acid ester.

An examination specimen was prepared in the same manner as in Example 1.

The specimen was immersed in the above-described dispersion for 5 minutes. Then, the specimen was removed from the dispersion and was dried at 70° C. for 5 hours.

Afterwards, the specimen was placed in an electric furnace at 380° C. for 3 minutes to cover the surface of the polyimide fiber with a coating layer of a copolymer of tetrafluoroethylene and perfluoropropylvinyl ether.

The adhering amount of coating layer was calculated by measuring the weight of the specimen.

Also, the coated amount was calculated.

The air permeable amount and the tensile strength retention were evaluated in the same manner as in Example 1.

The results obtained are shown in Table 2 below.

Example 6

A specimen was prepared, treated and evaluated in the same manner as in Example 5, except that a copolymer of tetrafluoroethylene and hexafluoropropylene having a mean particle diameter of 0.2 μm was used in place of the copolymer of tetrafluoroethylene and perfluoropropylvinyl ether.

The results obtained are shown in Table 2 below.

Example 7

A dispersion was prepared by dispersing 30 g of a copolymer of ethylene and tetrafluoroethylene having a mean particle diameter of 0.4 μm into a vessel containing 70 g of ethyl alcohol.

A specimen prepared in the same manner as in Example 5 was immersed in the above-described dispersion for 5 minutes. Then, the specimen was removed from the dispersion and was dried at 70° C. for 5 hours. Next, the dried specimen was placed in an electric furnace at 320° C. for 3 minutes to cover the surface of the polyimide fiber with a coating layer of a copolymer of ethylene and tetrafluoroethylene.

The specimen was evaluated in the same manner as in Example 5.

The results obtained are shown in Table 2 below.

Example 8

A dispersion was prepared by dispersing 30 g of a copolymer of tetrafluoroethylene and perfluoroalkylvinyl ether having a mean particle diameter of 0.4 μm into a vessel containing 60 g of ethyl alcohol and 5 g of B-staged phenol resin (resitol).

A specimen prepared in the same manner as in Example 5 was immersed in a 30% solution of the above-described dispersion for 5 minutes. Then, the specimen was removed from the dispersion and was dried at 70° C. for one hour. Next, the dried specimen was placed in an electric furnace at 380° C. for 3 minutes to cover the surface of the polyimide fiber with a coating layer of the copolymer of tetrafluoroethylene and perfluoroalkylvinyl ether.

The specimen was evaluated in the same manner as in Example 5.

The results obtained are shown in Table 2 below.

Example 9

A copolymer of fluoroethylene and ethylene ethyl ether (30 g, molecular weight: 80,000) was dissolved in small portions with stirring into a solution containing 68 g of methyl ethyl ketone and 2 g of Coronate EH (isocyanate setting agent, produced by NIPPON POLYURETHANE INDUSTRY, CO., LTD.) in a vessel.

A specimen prepared in the same manner as in Example 5 was immersed in the above-described solution. Then, the specimen was removed from the solution and was stored at 50° C. for 5 hours to evaporate the methyl ethyl ketone. Next, the specimen was stored at room temperature for 3 days to form a cured coating layer of a copolymer of fluoroethylene and ethylene ethyl ether on the surface of the polyimide fiber.

The specimen was evaluated in the same manner as in Example 5.

The results obtained are shown in Table 2 below.

Example 10

A copolymer of vinylidene fluoride and hexafluoropropylene (30 g) was dissolved in small portions with stirring into a solution containing 68 g of ethyl acetate and 2 g of polyamine in a vessel.

A specimen prepared in the same manner as in Example 5 was immersed in the above-described solution for 5 minutes. Then, the specimen was removed from the solution, excess solution was drained off, and the specimen was stored at 50° C. for 24 hours to evaporate the solvent. Next, the specimen was heated at 150° C. for 30 minutes to form a vulcanized coating layer of a copolymer of vinylidene fluoride and hexafluoropropylene on the surface of the polyimide fiber.

The specimen was evaluated in the same manner as in Example 5.

The results obtained are shown in Table 2 below.

Example 11

Polyol vulcanizing agent (5 g) was added to 100 g of a water latex containing a copolymer of vinylidene fluoride and hexafluoropropylene at a concentration of 50%.

A specimen prepared in the same manner as in Example 5 was immersed in the above-described water latex for 5 minutes. The specimen was removed from the water latex and excess latex was drained off. Then, the specimen was dried at 70° C. for one hour.

Next, the specimen was heated at 150° C. for 30 minutes to form a cured layer of a copolymer of vinylidene fluoride and hexafluoropropylene on the surface of the polyimide fiber.

The specimen was evaluated in the same manner as in Example 5.

The results obtained are shown in Table 2 below.

Comparative Example 6

A specimen was prepared, treated and evaluated in the same manner as in Example 5, except that the surface of the polyimide fiber was not covered with a copolymer.

The specimen was evaluated in the same manner as in Example 5.

The results obtained are shown in Table 2 below.

Comparative Example 7

A specimen prepared in the same manner as in Example 5 was immersed in a polytetrafluoroethylene dispersion having a mean particle diameter of 0.4 μm for 5 minutes prepared in the same manner as in Example 5. Then, the specimen was removed from the dispersion and dried at 70° C. for 24 hours. Next, the specimen was placed in an electric furnace at 380° C. for 3 minutes to cover the surface of the polyimide fiber with polytetrafluoroethylene.

The specimen was evaluated in the same manner as in Example 5.

The results obtained are shown in Table 2 below.

TABLE 2

| Example No. | Weight increase of the specimen (%) | Coated Amount (g/m$^2$) | Air permeable amount (ml/cm$^2$ · min) | Tensile strength retention 10% HCl immersion (23° C., 200 hr.) (%) | 5% NaOH immersion (23° C., 120 hr.) (%) |
|---|---|---|---|---|---|
| Example 5 | 10.6 | 50.4 | 530 | 93 | 85 |
| Example 6 | 8.2 | 40.0 | 560 | 97 | 89 |
| Example 7 | 11.3 | 53.7 | 510 | 94 | 87 |
| Example 8 | 10.1 | 50.0 | 500 | 95 | 88 |
| Example 9 | 9.8 | 46.6 | 550 | 93 | 82 |
| Example 10 | 10.3 | 48.9 | 440 | 95 | 86 |
| Example 11 | 11.1 | 52.7 | 420 | 96 | 88 |
| Comparative Example 6 | — | — | 590 | 53 | dissolved |
| Comparative Example 7 | 9.8 | 45.2 | 550 | 67 | dissolved |

The results of Examples 5 to 11 and Comparative Examples 6 and 7 show that the weak chemical resistance of untreated polyimide is improved by covering a nonwoven fabric or felt comprising polyimide fiber with a melting fluorine resin, a solvent-soluble cold setting fluorine resin or a fluorine elastomer according to the present invention. Consequently, the field of application of the thus treated polyimide fiber filter is expanded.

Example 12

An antistatic solution was prepared by dispersing 80 parts of B-staged SK Resin and 20 parts of acetylene black (mean particle diameter: 40 μm, $N_2$ surface area: 70 $m^2/g$) into a vessel containing 900 parts of tetrahydrofuran with stirring.

A sheet having a thickness of 1 mm was prepared in the same manner as in Example 1, and an examination specimen having a width of 100 mm and a length of 120 mm was cut off therefrom.

The examination specimen was immersed in the above-described antistatic solution for one minute. Then, the specimen was removed from the antistatic solution, dried with a drier and stored at 70° C. for 5 hours. Afterwards, the specimen was placed in an electric furnace at 230° C. for 2 hours to thermoset the SK Resin.

Next, the permeability of the specimen was measured using a fradiel type permeability tester (Permeameter, produced by Toyoseiki Seisakusyo Co., Ltd.), and its inherent volume resistance was measured using a Resistivity Chamber R12704 (manufactured by Advantest Corporation) according to JIS K6911 Article 5.13. Furthermore, the inherent volume resistivity was again measured after passing air heated at 250° C. through the specimen at a permeable rate of 1 m/min for 1,000 hours.

The results obtained are shown in Table 3 below.

Example 13

An antistatic solution was prepared by dispersing 90 parts of B-staged SK Resin and 10 parts of acetylene black into a vessel containing 400 parts of tetrahydrofuran.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate tetrahydrofuran. Next, the specimen was placed in an electric furnace at 230° C. for 2 hours to thermoset the SK Resin.

The specimen was evaluated in the same manner as in Example 12.

The results obtained are shown in Table 3 below.

Example 14

An antistatic solution was prepared by dispersing 90 parts of B-staged SK Resin and 10 parts of acetylene black into a vessel containing 200 parts of tetrahydrofuran.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate tetrahydrofuran. Next, the specimen was placed in an electric furnace at 230° C. for 2 hours to thermoset the SK Resin.

The specimen was evaluated in the same manner as in Example 12.

The results obtained are shown in Table 3 below.

Example 15

An antistatic solution was prepared by dispersing 90 parts of a copolymer of fluoroethylene and ethylene ethyl ether (molecular weight: 80,000), 5 parts of Coronate EH (isocyanate curing agent) and 10 parts of acetylene black into a vessel containing 400 parts of methyl ethyl ketone.

A specimen prepared in the same manner as in Example 12 was immersed in the above-described antistatic solution for one minute. Then, the specimen was removed from the dispersion, dried with a drier, and stored at 70° C. for one hour in a dehydrator to evaporate methyl ethyl ketone. Next, the specimen was stored at room temperature for 3 days to cure the copolymer of fluoroethylene and ethylene ethyl ether.

The specimen was evaluated in the same manner as in Example 12.

The results obtained are shown in Table 3 below.

Example 16

An antistatic solution was prepared by dispersing 96 parts of a copolymer of fluoroethylene and ethylene ethyl ether (molecular weight: 80,000), 5 parts of Coronate EH (isocyanate curing agent) and 4 parts of Ketjen Black EC (mean particle diameter: 30 μm, $N_2$ surface area: 930 $m^2/g$, produced by Ketjen Black International Co., Ltd.) which is a type of furnace black into a vessel containing 400 parts of methyl ethyl ketone.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate methyl ethyl ketone. Next, the specimen was stored at room temperature for 3 days to cure the copolymer of fluoroethylene and ethylene ethyl ether.

The specimen was evaluated in the same manner as in Example 12.

The results obtained are shown in Table 3 below.

Example 17

An antistatic solution was prepared by dispersing 94 parts of fluorine elastomer (Dai-el, vinylidenfluoridehexafluoropropylene copolymer, produced by Daikin Industries, Ltd.) and 6 parts of Ketjen Black EC into 900 parts of ion-exchanged water.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate water. Next, the specimen was placed in an electric furnace at 150° C. for one hour to cure the fluorine elastomer.

The specimen was evaluated in the same manner as in Example 12.

The results obtained are shown in Table 3 below.

Example 18

An antistatic solution was prepared by dispersing 96 parts of fluorine elastomer (Dai-el) and 4 parts of Ketjen Black EC into 400 parts of ion-exchanged water.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate water. Next, the specimen was placed in an electric furnace at 150° C. for one hour to cure the fluorine elastomer.

The specimen was evaluated in the same manner as in Example 12.

The results obtained are shown in Table 3 below.

Example 19

An antistatic solution was prepared by dispersing 98 parts of fluorine elastomer (Dai-el) and 2 parts of Ketjen Black EC into 200 parts of ion-exchanged water.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate water. Next, the specimen was placed in an electric furnace at 150° C. for one hour to cure the fluorine elastomer.

The specimen was evaluated in the same manner as in Example 12.

The results obtained are shown in Table 3 below.

Comparative Example 8

An antistatic solution was prepared by dispersing 90 parts of B-staged SK Resin and 10 parts of acetylene black into a vessel containing 1,500 parts of tetrahydrofuran.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate tetrahydrofuran. Next, the specimen was placed in an electric furnace at 230° C. for 2 hours to thermoset the SK Resin.

The specimen was evaluated in the same manner as in Example 12.

The results obtained are shown in Table 3 below.

Comparative Example 9

An antistatic solution was prepared by dispersing 80 parts of B-staged SK Resin and 20 parts of acetylene black into a vessel containing 200 parts of tetrahydrofuran.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate tetrahydrofuran. Next, the specimen was placed in an electric furnace at 230° C. for 2 hours to thermoset the SK Resin.

The specimen was evaluated in the same manner as in Example 12.

The results obtained are shown in Table 3 below.

Comparative Example 10

An antistatic solution was prepared by dispersing 98 parts of fluorine elastomer (Dai-el) and 2 parts of Ketjen Black EC into 1,500 parts of ion-exchanged water.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate water. Next, the specimen was placed in an electric furnace at 150° C. for one hour to cure the fluorine elastomer.

The specimen was evaluated in the same manner as in Example 12.

The results obtained are shown in Table 3 below.

Comparative Example 11

An antistatic solution was prepared by dispersing 94 parts of fluorine elastomer (Dai-el) and 6 parts of Ketjen Black EC into 200 parts of ion-exchanged water.

A specimen prepared in the same manner as in Example 12 was immersed in the above-described antistatic solution for one minute. Then, the specimen was removed from the antistatic solution, dried with a drier, and stored at 70° C. for one hour in a dehydrator to evaporate water. Next, the specimen was placed in an electric furnace at 150° C. for one hour to cure the fluorine elastomer.

The specimen was evaluated in the same manner as in Example 12.

The results obtained are shown in Table 3 below.

TABLE 3

|  | Ex. 12 | Ex. 13 | Ex. 14 | Ex. 15 | Ex. 16 | Ex. 17 | Ex. 18 | Ex. 19 |
| --- | --- | --- | --- | --- | --- | --- | --- | --- |
| Component (Parts by weight) | | | | | | | | |
| SK resin | 80 | 90 | 90 | — | — | — | — | — |
| Copolymer* | — | — | — | 90 | 96 | — | — | — |
| Coronate EH | — | — | — | 5 | 5 | — | — | — |
| Fluorine elastomer | — | — | — | — | — | 94 | 96 | 98 |
| Acetylene black | 20 | 10 | 10 | 10 | — | — | — | — |
| Ketjen Black | — | — | — | — | 4 | 6 | 4 | 2 |
| Tetrahydrofuran | 900 | 400 | 200 | — | — | — | — | — |
| Methyl ethyl ketone | — | — | — | 400 | 400 | — | — | — |
| Ion-exchanged water | — | — | — | — | — | 900 | 400 | 200 |
| Property | | | | | | | | |

TABLE 3-continued

| Permeability ($cm^3/cm^2 \cdot S$) | 7.6 | 5.2 | 8.5 | 4.2 | 9.2 | 11.3 | 8.8 | 6.2 |
|---|---|---|---|---|---|---|---|---|
| Inherent volume resistance ($\Omega$-cm) | | | | | | | | |
| Before heat treatment | $1.1 \times 10^4$ | $5.4 \times 10^6$ | $2.1 \times 10^6$ | $6.2 \times 10^5$ | $5.4 \times 10^5$ | $1.3 \times 10^3$ | $3.6 \times 10^5$ | $2.1 \times 10^8$ |
| After heat treatment 1,000 hr. | $7.5 \times 10^4$ | $8.5 \times 10^6$ | $9.3 \times 10^6$ | $9.8 \times 10^5$ | $6.7 \times 10^5$ | $5.1 \times 10^3$ | $7.3 \times 10^5$ | $6.6 \times 10^8$ |

| | Comp. Ex. 8 | Comp. Ex. 9 | Comp. Ex. 10 | Comp. Ex. 11 |
|---|---|---|---|---|
| Component (Parts by weight) | | | | |
| SK resin | 90 | 80 | — | — |
| Copolymer* | — | — | — | — |
| Coronate EH | — | — | — | — |
| Fluorine elastomer | — | — | 98 | 94 |
| Acetylene black | 10 | 20 | — | — |
| Ketjen Black | — | — | 2 | 6 |
| Tetrahydrofuran | 1500 | 200 | — | — |
| Methyl ethyl ketone | — | — | — | — |
| Ion-exchanged water | — | — | 1500 | 200 |
| Property | | | | |
| Permeability ($cm^3/cm^2 \cdot S$) | 12.3 | 0.8 | 12.3 | 1.5 |
| Inherent volume resistance ($\Omega$-cm) | | | | |
| Before heat treatment | $3.6 \times 10^8$ | $6.7 \times 10^4$ | $7.2 \times 10^9$ | $1.1 \times 10^3$ |
| After heat treatment 1,000 hr. | $4.3 \times 10^9$ | $8.5 \times 10^4$ | $1.6 \times 10^{10}$ | $4.8 \times 10^3$ |

*Note: Copolymer; Copolymer of fluoroethylene and ethylene ethyl ether

The results of Examples 12 to 19 and Comparative Examples 8 to 11 show that the present invention provides a polyimide fiber having an antistatic property by covering a nonwoven fabric or felt comprising the polyimide fiber with an electroconductive material, in addition to a condensed polycyclic polynucleus aromatic resin, a solvent-soluble cold setting fluorine resin or a fluorine elastomer. Consequently, the field of application of the thus treated filter is expanded.

While the invention has been described in detail and with reference to specific embodiments thereof, it will be apparent to one skilled in the art that various changes and modifications can be made therein without departing from the spirit and scope thereof.

What is claimed is:

1. A water vapor resistant filter comprising a permeable molded material, nonwoven fabric or felt and a solid-coating thereon, wherein the permeable molded material, nonwoven fabric or felt comprises polyimide fiber having a repeating unit represented by the following formula (I), and the permeable molded material, nonwoven fabric or felt is covered with a condensed polycyclic polynucleus aromatic resin:

wherein n represents an integer of more than 1;

X represents a tetravalent aromatic group selected from the group consisting of and and R represents at least one divalent aromatic group selected from the group consisting of and and R represents at least one divalent aromatic group selected from the group consisting of and 2. The water vapor resistant filter as claimed in claim 1, wherein the condensed polycyclic polynucleus aromatic resin is prepared by a heating condensation polymerization reaction between a condensed polycyclic aromatic hydrocarbon and a crosslinking agent in presence of an acid catalyst.

3. The water vapor resistant filter as claimed in claim. 2, wherein the condensed polycyclic aromatic hydrocarbon is selected from the group consisting of naphthalene, anthracene, phenanthrene, pyrene and pitch.

4. The water vapor resistant filter as claimed in claim 2, wherein the crosslinking agent is 1,4-benzenedimethanol.

5. A water vapor resistant filter comprising a permeable molded material, nonwoven fabric or felt and a solid coating thereon, wherein the permeable molded material, nonwoven fabric or felt comprises polyimide fiber having a repeating unit represented by the following formula (I), and the permeable molded material, nonwoven fabric or felt is covered with a melting fluorine resin, a solvent-soluble cold setting fluorine resin or a fluorine elastomer:

wherein n represents an integer of more than 1;

X represents a tetravalent aromatic group selected from the group consisting of and 6. A water vapor resistant antistatic filter comprising a permeable molded material, nonwoven fabric or felt and a solid coating thereon, wherein the permeable molded material, nonwoven fabric or felt comprises polyimide fiber having a repeating unit represented by the following formula (I), and the permeable molded material, nonwoven fabric or felt is covered with (i) an electroconductive material and (ii) a condensed polycyclic polynucleus aromatic resin, a solvent-soluble cold setting fluorine resin or a fluorine elastomer:

wherein n represents an integer of more than 1;

X represents a tetravalent aromatic group selected from the group consisting of and

-continued and

R represents at least one divalent aromatic group selected from the group consisting of and

7. The water vapor resistant antistatic filter as claimed in claim 6, wherein the electroconductive material is a carbon black powder or a metal powder.

8. A process for producing a water vapor resistant filter, which comprises the steps of immersing a permeable molded material, nonwoven fabric or felt comprising a polyimide fiber having a repeating unit represented by the following formula (I) into an organic solution containing a condensed intermediate of a condensed polycyclic polynucleus aromatic resin in a concentration of from 20 to 60% by weight, and drying the immersed permeable molded material, nonwoven fabric or felt to thereby cover the permeable molded material, nonwoven fabric or felt with the condensed intermediate, and thermosetting the condensed intermediate covering the permeable molded material, nonwoven fabric or felt:

(I)

wherein n represents an integer of more than 1;

X represents a tetravalent aromatic group selected from the group consisting of

-continued and and

R represents at least one divalent aromatic group selected from the group consisting of and

9. A process for producing a water vapor resistant filter, which comprises the steps of coating a permeable molded material, nonwoven fabric or felt comprising polyimide fiber having a repeating unit represented by the following formula (I) with a dispersion of a melting fluorine resin fine powder dispersed in water or in an organic solvent or with a dispersion of a melting fluorine resin fine powder and a synthetic resin dispersed in water or in an organic solvent, and heating the coated permeable molded material, nonwoven fabric or felt at a temperature of from 260° to 400° C. to solidify the coating thereon:

(I)

wherein n represents an integer of more than 1;

X represents a tetravalent aromatic group selected from the group consisting of and and

R represents at least one divalent aromatic group selected from the group consisting of and

10. A process for producing a water vapor resistant filter, which comprises the steps of coating a permeable molded material, nonwoven fabric or felt comprising polyimide fiber having a repeating unit represented by the following formula (I) with a solution of a solvent-soluble cold setting fluorine resin, and drying the coated permeable molded material, nonwoven fabric or felt at room temperature or by heating to solidify the coating thereon:

(I)

wherein n represents an integer of more than 1;

X represents a tetravalent aromatic group selected from the group consisting of and and

R represents at least one divalent aromatic group selected from the group consisting of and

11. A process for producing a water vapor resistant filter, which comprises the steps of coating a permeable molded material, nonwoven fabric or felt comprising polyimide fiber having a repeating unit represented by the following formula (I) with a solution or latex of a fluorine elastomer, and heating the coated permeable molded material, nonwoven fabric or felt to solidify the coating thereon:

(I)

wherein n represents an integer of more than 1;

X represents a tetravalent aromatic group selected from the group consisting of and and

R represents at least one divalent aromatic group selected from the group consisting of and

12. A process for producing a water vapor resistant antistatic filter, which comprises the steps of coating a permeable molded material, nonwoven fabric or felt comprising polyimide fiber having a repeating unit represented by the following formula (I) with an electroconductive material and a condensed polycyclic polynucleus aromatic resin dispersed in an organic solvent, and heating the coated permeable molded material, nonwoven fabric or felt at a temperature of from 150° to 300° C. to solidify the coating thereon:

(I)

wherein n represents an integer of more than 1;

X represents a tetravalent aromatic group selected from the group consisting of and R represents at least one divalent aromatic group selected from the group consisting of and

13. A process for producing a water vapor resistant antistatic filter, which comprises the steps of coating a permeable molded material, nonwoven fabric or felt comprising polyimide fiber having a repeating unit represented by the following formula (I) with an electroconductive material and a solvent-soluble cold setting fluorine resin dispersed in an organic solvent, and drying the coated permeable molded material, nonwoven fabric or felt at room temperature or by heating to solidify the coating thereon:

(I)

wherein n represents an integer of more than 1;

X represents a tetravalent aromatic group selected from the group consisting of and R represents at least one divalent aromatic group selected from the group consisting of and

14. A process for producing a water vapor resistant antistatic filter, which comprises the steps of coating a permeable molded material, nonwoven fabric or felt comprising polyimide fiber having a repeating unit represented by the following formula (I) with an electroconductive material and a fluorine elastomer dispersed in water or in an organic solvent, and drying the coated permeable molded material, nonwoven fabric or felt at room temperature or by heating to solidify the coating thereon:

wherein n represents an integer of more than 1;

X represents a tetravalent aromatic group selected from the group consisting of and and R represents at least one divalent aromatic group selected from the group consisting of and

* * * * *